United States Patent
Lorenz et al.

(10) Patent No.: US 6,436,260 B1
(45) Date of Patent: Aug. 20, 2002

(54) PROCESS FOR ELECTROCOATING BULK ARTICLES

(75) Inventors: Klaus-Peter Lorenz, Meerbusch; Gabriele Buettner, Ratingen; Klausjoerg Klein, Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/715,425

(22) Filed: Nov. 17, 2000

(51) Int. Cl.⁷ .............................................. C25D 13/00
(52) U.S. Cl. ........................................ 204/484
(58) Field of Search ........................................ 204/484

(56) References Cited

U.S. PATENT DOCUMENTS

| | | |
|---|---|---|
| 4,421,620 A | 12/1983 | Kaylo et al. |
| 5,810,987 A * | 9/1998 | Opitz .......................... 204/512 |

FOREIGN PATENT DOCUMENTS

| | | |
|---|---|---|
| EP | 0 421 247 | 4/1991 |
| WO | Wo96/34064 | 10/1996 |

OTHER PUBLICATIONS

Guder et al., Elektrotauchlackierung mit rubgefullten Systemen, Farbe + Lack, Jul./1987, pp. 539–545.

* cited by examiner

Primary Examiner—Kishor Mayekar
(74) Attorney, Agent, or Firm—Sudhir G. Deshmukh

(57) ABSTRACT

This invention is directed to a process for electrocoating bulk articles to provide a corrosion protective coating and comprises the following steps:

(1) the bulk articles to be coated are placed in an electrically conductive receiving container and the container and bulk articles are electrocoated with an aqueous electrocoating composition containing a film forming binder and electrically conductive components;

(2) baking the coated bulk articles and the receiving container to form an electrically conductive coating on the bulk articles and the container and removing the coated bulk articles from the container; and (3) repeating steps (1) and (2) at least once without any intermediate cleaning of the receiving container having an electrically conductive coating.

The advantage of the novel process of this invention is that the receiving container can be used at least twice and up to six times without any intermediate cleaning or removal of the applied electrocoating layer.

9 Claims, No Drawings

PROCESS FOR ELECTROCOATING BULK ARTICLES

BACKGROUND OF THE INVENTION

This invention relates to a process for electrocoating bulk articles, such as screws, that are placed in a container and then electrocoated with an electrocoating composition.

Electrocoating is a process that is used for the coating of industrial bulk goods, in particular, used in the coating of metallic substrates in order to protect them against corrosion. In this case, the electrocoating process generally is limited to a process for priming the metallic substrates with a protective coating.

When bulk articles, for example screws, are electrocoated, no additional coatings are applied. A single layer of an electrocoating composition generally is sufficient to protect the bulk articles from corrosion, in particular against the effects of weather and humidity.

To increase the corrosion protection, an additional layer of an electrocoating composition can be deposited on the electrocoated bulk articles. This can readily be accomplished by making the initial layer of the electrocoating composition electrically conductive. EP-A 421 247 describes the double-coating of metallic substrates, such as metallic fastening elements, by applying an anodic coating, thermally curing the coated elements and then applying a cathodic coating and curing that coating. The use of conductive carbon blacks in double coating of articles using an electrocoating process is described in F. Beck and H. Guder, "Elektrotauchlackierung mit rubgefallten Systemen", Farbe+Lack, 93. Jahrgang July 1987, S. 539 ff. but does not show the coating of bulk articles that require the use of a receiving container in the electrocoating process.

In a conventional electrocoating process for coating bulk articles, the bulk articles are placed in basket-like conductive construction (receiving container), preferably, made of metal. In the electrocoating process, an electrical contact is made with the receiving container and electrical current is passed through the bulk articles in the container that are in direct contact with the container and each other. During electrocoating, the bulk articles and the receiving container are coated. Then, the receiving container and the coated bulk articles are place in an oven and baked to form a coating layer or film on the bulk articles. However, a coating layer also is formed on the receiving container and this layer substantially reduces the electrical conductivity of the receiving container. In order to use this receiving container in a subsequent electrocoating process, the coating layer must be removed so that there is an electrical contact between the container and the bulk articles to be coated. Such removal requires a special chemical or solvent treatment that incurs considerable time and expense. There is a need for a process that will eliminate or substantially reduce this removal or cleaning operation that is currently required by conventional electrocoating process used to coat bulk articles.

SUMMARY OF THE INVENTION

This invention is directed to a process for electrocoating bulk articles to provide a corrosion protective coating and comprises the following steps:

(1) the bulk articles to be coated are placed in an electrically conductive receiving container and the container and bulk articles are electrocoated with an aqueous electrocoating composition containing a film forming binder and electrically conductive components;

(2) baking the coated bulk articles and the receiving container to form an electrically conductive coating on the bulk articles and the container and removing the coated bulk articles from the container; and (3) repeating steps (1) and (2) at least once without any intermediate cleaning of the receiving container having an electrically conductive coating.

The advantage of the novel process of this invention is that the receiving container can be used at least twice and up to six times without any intermediate cleaning or removal of the electrocoating layer that has been applied since the coating is electrically conductive and allows for further electrocoating of bulk articles. This has not been possible with prior art processes.

DETAILED DESCRIPTION OF THE INVENTION

In the process of this invention, an electrocoating composition containing electrically conductive components is deposited on bulk articles and then the coated articles are baked at an elevated temperature. An electrically conductive coating layer is formed on the coated bulk articles and on the receiving container holding the coated bulk articles.

After the electrocoated and baked bulk articles have been removed from the receiving container, the container can be used again without removing any coating deposited on the container and the container is filled with bulk articles that are to be coated and these articles then are electrocoated in the receiving container. The conductive coating layer on the receiving container imparts sufficient electrical contact to the bulk articles to be coated so that they can be electrocoated even though the receiving container has already been coated. This makes it possible to use the receiving container in the electrocoating process for up to six times in a row without intermediate removal of the coating with solvents, chemicals or by mechanical means, such as brushing.

The electrical resistance of the coating deposited on the receiving container is generally slightly higher than a container without the coating but this can be compensated for by adequately controlling the deposition voltage and deposition time in order to obtain the same required coating thickness on the bulk articles.

Anodic or cathodic deposition electrocoatings that are known in the art can be used as the electrocoating composition used in the process of this invention. These coating compositions contain components that impart a sufficiently low specific electrical resistance to the coating. The resulting coating, after baking at an elevated temperature, has the required level of electrical conductivity.

Suitable electrocoating compositions useful in the process of this invention can be either anodic or cathodic electrocoating compositions. These compositions are based on the anionic or acid film forming binders or cationic or alkaline film binders that are conventionally used in electrodeposition processes. Examples of such binders are: epoxy resins, acrylic resins, polyester resins, maleic oils, polybutadiene oils, polyurethane resins, and polybutadiene resins.

In these electrocoating compositions, at least one part of the binders carries ionic substituents and/or substituents able to be converted into ionic groups and optionally, chemically cross-linkable groups.

The ionic groups or the groups able to be converted into ionic groups of the binder can be anionic groups or groups able to be converted into anionic groups, i.e. acid groups, such as COOH, $FO_3H$, $PO_3H$ and the corresponding anionic groups neutralized with a base. They may also be cationic groups or groups able to be converted into cationic groups, for example, alkaline groups, preferably nitrogenous alkaline groups. These groups may be present in quaternized form, or they can be converted into ionic groups with a conventional neutralizing agent, for example an organic monocarboxylic acid such as, formic acid or ethanoic acid. Examples of such groups are amino, ammonium, phosphonium and/or sulfonium groups.

Examples of anodic electrocoating binders are binders based on polyesters, epoxy resin esters, (meth)acrylic copolymer resins, maleic oils or polybutadiene oils having an average weight molecular mass (Mw), for example of 300 to 10 000 and an acid value, for example of 35 to 300. These binders carry, for example, COOH—, $SO_3H$— and/or $PO_3H_2$-groups. The resins may be converted into the aqueous phase after neutralization of at least some of the acid groups.

Examples of cathodic electrocoating binders are resins containing primary, secondary and/or tertiary amino groups having amine values, for example of 20 to 250, and an average weight molecular mass (Mw) of the resin, for example of 300 to 10,000. Examples of such resins are amino(meth)acrylic resins, aminoepoxy resins having primary OH groups, aminopolyurethane resins, amino group-containing polybutadiene resins and modified epoxy resin-carbon dioxide-amine reaction products.

The film forming binder suitable for use in the present invention may be self-cross-linking or externally cross-linked. Hence, anodic electrocoating compositions can contain conventional cross-linking agents, for example triazine resins, cross-linking agents having groups that can be trans-esterified or blocked polyisocyanates. Cathodic electrocoating compositions can contain crosslinking agents, such as aminoresins, blocked polyisocyanates, cross-linking agents having terminal double bonds, polyoxide compounds or cross-linking agents having groups which can be transesterified. Cathodic electrocoating compositions are preferred for the process of this invention.

To obtain the desired level of electrical conductivity in the layer of the electrocoating composition after it has been baked and cured, the electrocoating composition contains components that impart electrical conductivity.

Examples of such components are particle-shaped electrical conductors or semi-conductors, for example, black iron oxide, graphite, high-conductivity carbon black, metallic powder, such as aluminium, copper or special steel, molybdenum disulfide, special high-conductivity pigments based on mica sheet, for example mica sheet sheathed with tin oxide that is doped with antimony and polymers with electrical conductivity.

Conductive carbon black, graphite or black iron oxide are preferred.

The electrocoating composition used in the process of this invention contains a sufficient amount of these components to provide a desired level of electrical conductivity to a layer of the coating after it has been electrocoated and baked on a substrate, such as the bulk articles or the receiving container. Typically, the proportion of the components used in an electrocoating composition is, for example, 1 to 30 wt-%, based on the solids content of the coating composition. The proportion is dependent on the specific weight, the specific electrical conductivity and the particle size of the components imparting electrical conductivity that are used and can easily be determined by the person skilled in the art.

One or more components imparting electrical conductivity in combination can be present in the electrocoating composition used in this invention.

Due to the presence of these components imparting electrical conductivity to the electrocoating composition, the specific resistance of the composition can be reduced. For example, a conventional baked electrocoating film, typically has a specific resistance of more than $10^9$ Ω×cm. This can be reduced by a multiple of at least 10, for example, below $10^8$ Ω×cm, and in the range of 104 Ω×cm to 106 Ω×cm for a baked electrocoating film containing one or more of the aforementioned components.

The coating compositions that can be used according to the invention can have solids of 10 to 50 wt-%, typically 10 to 20 wt-%, based on the weight of the composition. The solids content of the electrocoating composition comprises the binders used in the composition, the optionally present cross-linking agents, the components imparting electrical conductivity and additional components conventionally used in electrocoating compositions, such as, pigments, fillers and/or additives.

Conventional inorganic and/or organic colour pigments can be used in the electrocoating composition, such as, titanium dioxide, iron oxide, carbon black, phthalocyanine pigments, and quinacridone pigments. Metallic pigments also can be used. Pigments can be dispersed in the electrocoating composition by using conventional techniques, for example a pigment paste can be formulated and added to the electrocoating composition.

Examples of fillers that can be used in the electrocoating composition are kaolin, talcum or silicon dioxide.

Suitable conventional additives useful in electrocoating compositions can be used, such as wetting agents like nonyl-phenyl-polyglycol ether, neutralizing agents, levelling agents, catalysts, corrosion inhibitors, antifoaming agents and solvents.

The electrocoating composition to be used in the process of this invention is electrophoretically deposited in a conventional manner, for example at 150 to 300 V for 30 seconds to 4 minutes, and is baked under conventional conditions, for example, for 20 minutes at 150 to 180° C.

After the baking step, coatings having a dry film thickness, for example, of 5 to 15 μm are obtained. The electrical conductivity depends on the use of the components imparting electrical conductivity, the deposition, the baking, and curing conditions.

In the case of a two-layered electrocoating of bulk articles, the second electrocoating layer is prepared according to the process of the invention. The same electrocoating composition can be used or a modified version of this composition can be used. For example, a clear electrocoating can be deposited over the first layer. It is possible to apply other coatings as needed to provide desired properties.

Bulk articles coated according to the process of this invention have satisfactory corrosion resistance and do not require any further coatings and the articles can be stored without impairing the articles until they are used.

Examples of bulk articles that can be coated by the process of this invention are fastening elements made of metal, for example, screws, nails, picture hooks, rivets, nuts and bolts.

By using the process according to the invention, it is possible to use the receiving containers that hold the bulk articles during the electrocoating process several times in a row (up to six times) without the need to render them electrically conductive again. The receiving containers provide the necessary electrical connection to the bulk articles being coated and must remain electrically conductive during the process. Obviously, these containers also are coated during the process but by using an electrocoating composition that contains components that render the composition conductive, the containers can be reused without cleaning by chemicals or solvents or by mechanical means. Thus, considerable expenditure of work and time can be saved by using the process of this invention in comparison with the conventional electrocoating processes for bulk articles that use electrocoating compositions that do not form electrically conductive films.

The bulk articles that are coated and baked according to the process of this invention have a complete coating that has the required corrosion resistance.

The invention is described in more detail by means of the following example.

EXAMPLE

A cathodic electrocoating composition based on epoxy amine adduct and blocked polyisocyanate, having a solids content of 18 wt-% and a content of 2 wt-% conductive carbon black was used according to the invention for electrocoating metallic screws. These screws were positioned in a metallic electrically conductive receiving container. Electrodeposition was carried out at 200 V for 1 minute and then the receiving container containing the screws was baked for 25 minutes at 180° C. The specific resistance of the baked electrodeposited coating composition on the receiving container was $10^6$ $\Omega \times cm$.

After the electrocoated bulk screws were removed from the receiving container, the container was again charged with metallic bulk screws to be coated and the screws and the container were electrocoated and baked according to the above-mentioned conditions. The specific resistance of the baked electrodeposited coating composition on the receiving container was $2 \times 10^6$ $\Omega \times cm$. Thereafter the receiving container was used again to electrocoat bulk screws by using a deposition voltage that is only a little higher then 200 V.

The thickness of the baked layer of the electrocoating composition on the screws was the same thickness as the first screws that were electrocoated and all of the electrocoated screws had good corrosion resistance.

In comparison, a cathodic electrocoating composition based on epoxy amine adduct and blocked polyisocyanate, containing the same additives as the above coating composition of this invention, but which did not contain the components imparting electrical conductivity (conductive carbon black), was used to electrocoat bulk metallic screws using the same electrocoating process and baking condition as shown above. The coating on the screws and the receiving container had the same thickness as above but the coating had a specific resistance of more than $10^9$ $\Omega \times cm$. Further use of the receiving container for additional electrocoating of bulk screws was not possible since the resistance was too high to allow for subsequent deposition of the electrocoating composition.

What is claimed is:

1. A process for coating bulk articles with an electrocoating composition comprising the following steps:
   (1) placing bulk articles to be coated in an electrically conductive receiving container and electrocoating the bulk articles and the receiving container with a coating composition that contains a film forming binder and electrically conductive components;
   (2) baking the resulting coated articles to form an electrically conductive coating on said bulk articles and container and removing said coated bulk articles from the receiving container and
   (3) repeating steps (1) and (2) at least once without any intermediate cleaning of the receiving container having an electrically conductive coating thereon.

2. The process of claim 1 in which the electrocoating composition is selected from the group consisting of an anodic electrocoating composition and a cathodic electrocoating composition; wherein the electrocoating composition contains a film forming binder and components that imparting electrical conductivity to the composition.

3. The process of claim 2 in which the components that impart electrical conductivity are selected from the group consisting of black iron oxide, graphite, high-conductivity carbon black, metallic powder, molybdenum disulfide, special high-electrically conductive pigments based on plated mica and an electrically conductive polymer and any mixtures thereof.

4. The process of claim 1 in which steps (1) and (2) can be repeated up to six times without any cleaning or removal of the coating from the receiving container.

5. The process of claim 1 wherein the electrocoating composition contains a film forming binder selected from the group consisting epoxy resins, acrylic resins, polyester resins, maleic oils, polybutadiene oils, polyurethane resins and polybutadiene resins.

6. The process of claim 5 wherein the binder contains substituents selected from the group consisting of ionic substituents and substituents that are convertible to ionic substituents and wherein said substituents being capable of chemically cross-linking with a crosslinking agent.

7. The process of claim 6 in which the crosslinking agent is selected from the group consisting of a blocked polyisocyanate and an amino resin.

8. The process of claim 5 in which the film forming binder is a cathodic epoxy amine adduct and the binder contains a blocked polyisocyanate crosslinking agent and the electrically conductive component is electrically conductive carbon black.

9. A process for coating bulk articles with an electrocoating composition comprising the following steps:
   (1) placing bulk articles to be coated in an electrically conductive receiving container and electrocoating the bulk articles and the receiving container with a coating composition that contains a film forming binder and electrically conductive components;
   (2) baking the resulting coated articles to form an electrically conductive coating on said bulk articles and container; and
   (3) repeating steps (1) and (2) once without any intermediate cleaning of the receiving container having an electrically conductive coating thereon and removing the coated bulk articles from the receiving container.

* * * * *